United States Patent [19]

Deal

[11] 4,240,243
[45] Dec. 23, 1980

[54] INTAKE BALANCING AND SATELLITE COLLECTOR SYSTEM

[76] Inventor: Troy M. Deal, 277 Trismen Ter., Winter Park, Fla. 32789

[21] Appl. No.: 18,136

[22] Filed: Mar. 7, 1979

[51] Int. Cl.³ .............................................. A01D 44/00
[52] U.S. Cl. ................................................. 56/8; 56/9
[58] Field of Search ................ 56/8, 9, 328 R; 37/62, 37/63, 58, 59

[56] References Cited

U.S. PATENT DOCUMENTS

| 2,181,863 | 12/1939 | Bell | 56/9 |
| 2,661,550 | 12/1953 | Graham | 37/58 |
| 3,412,862 | 11/1968 | Chaplin | 56/9 |
| 3,599,354 | 8/1971 | Larson | 56/8 |
| 3,621,593 | 11/1971 | Hickey | 37/63 |
| 3,808,779 | 5/1974 | Randall | 56/9 |
| 3,866,396 | 2/1975 | Meyer | 56/9 |
| 3,871,040 | 3/1975 | Marasco | 56/328 R |
| 4,172,617 | 10/1970 | de Koning | 37/58 |

*Primary Examiner*—Paul J. Hirsch
*Attorney, Agent, or Firm*—Beaman & Beaman

[57] ABSTRACT

A method of controlling, harvesting and handling large acreages of aquatic growths and other underwater products and materials through the use of satellite harvesters coupled to a land or water based transfer pumping station for delivery of the harvest to a remote spoil, storage or processing area.

1 Claim, 2 Drawing Figures

U.S. Patent     Dec. 23, 1980     4,240,243
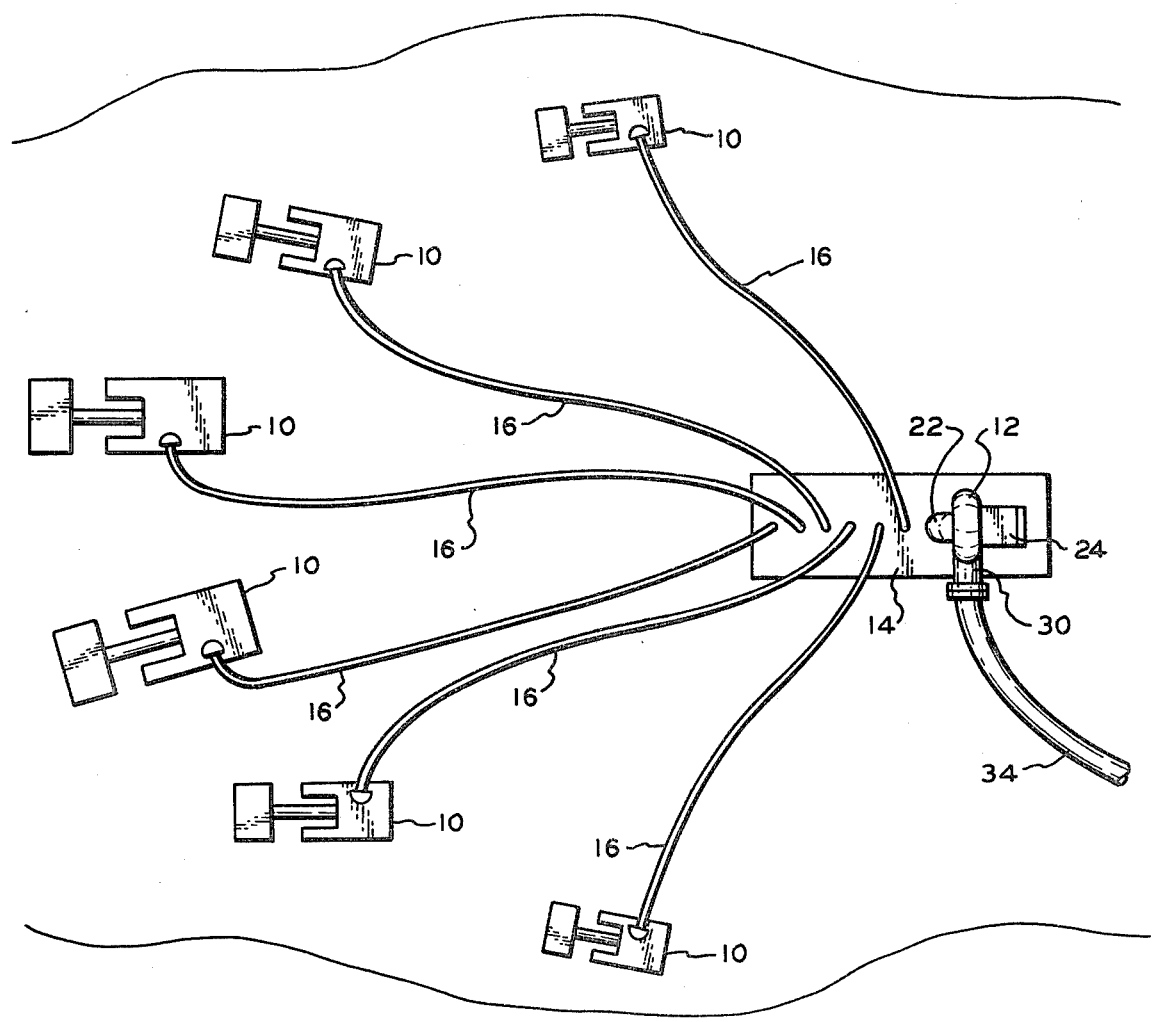
FIG_1.
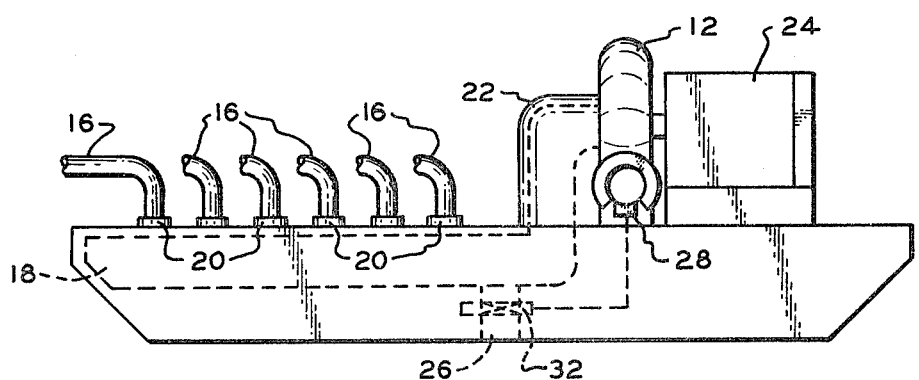
FIG_2.

INTAKE BALANCING AND SATELLITE COLLECTOR SYSTEM

BACKGROUND OF THE INVENTION

To control and harvest aquatic growths and other commercial products and materials free standing in or disposed on the bottom of bodies of water, both fresh and saline, it has been the practice to employ floating barges, scows, dredges and the like to support slurry pumping equipment. See U.S. Pat. Nos. 3,599,354; 3,862,537 and 3,866,396.

In most environments it has not been practical to store the products and materials being harvested upon the floating structure carrying the pumping equipment used to bring the harvest aboard. When large underwater acreages are being harvested, fluid transportation of the harvest to remote points such as spoil, storage and processing areas requires larger transfer pumping equipment than is practical to mount upon the harvester.

SUMMARY OF THE INVENTION

The present invention proposes to harvest large underwater acreages through the employment of a plurality of satellite harvesters in coupled fluid communication with a transfer pumping station. As the productivity of the satellite harvesters will not be constant during the operation of the transfer pumping station, the invention contemplates the balancing of the intake supply to the transfer pump by dilution of the slurry being delivered by the harvesters. This dilution of the slurry will assure an efficient and non-clogging transportation of the harvested slurry between the transfer pump and the point of remote discharge of the harvested aquatic growth and other underwater products and materials.

BRIEF DESCRIPTION OF THE DRAWINGS

FIG. 1 is a schematic plan view of a plurality of satellite harvesters in coupled fluid communication with a transfer pumping station, and FIG. 2 is a side elevational view of the barge carrying the transfer pump and the sensor controlled slurry dilution means.

BRIEF DESCRIPTION OF THE PREFERRED EMBODIMENT

As shown in FIG. 1, the underwater harvesters 10 are in coupled fluid communication with the intake supply to the transfer pump 12 on the barge 14 through suitable flexible discharge conduits 16.

Referring to FIG. 2, the conduits 16 are removably attached to the intake manifold 18 by suitable couplings 20. Manifold 18 communicates with the intake 22 of the transfer pump 12 driven by the engine 24. Also communicating with the intake manifold 18 is a sensor controlled water intake 26 for automatically balancing, by dilution, the supply of slurry being delivered to the intake 22 of the transfer pump 12. As will be readily understood, the amount of dilution necessary will vary and it will be dependent upon changes in productivity rate of the satellite harvesters.

A suitable flow rate sensor 28 in the outlet 30 of the pump 12 controls the operation of the valve 32 in the intake 26. Conduit 34 connected to the outlet 30 will transport the slurry of aquatic growths or other underwater products and materials to a remote spoil, storage or processing area.

Whenever the rate of slurry flow from the harvesters 10 through the conduits 16 tends to starve the supply of slurry to the intake manifold 18 to an extent that would affect the efficient transportation of the slurry by the pump 12, the valve 32 is opened to the necessary amount to satisfy the flow rate sensor 28.

As long as the pumps on the satellite harvester 10 are able to maintain a pressure in the manifold 18 greater than atmospheric the intake supply demands of the pump 12 are being satisfied and the valve 32 will remain closed and no dilution of the slurry will take place. However, when the intake slurry supply is inadequate to satisfy the sensor 28, the valve 32 is opened and the reduced pressure in the manifold 18 will draw water directly from the waterway through the intake 26 into the manifold.

The harvester 10 may take many forms and may be functioning to pump a slurry material of aquatic growth, sand, gravel, shells, shell fish, minerals and the like.

I claim:

1. A method of harvesting and transporting underwater products and material including aquatic growths in the form of a slurry comprising the steps of forming a slurry at a plurality of satellite pumping stations with the products and materials being harvested, pumping the slurry of said stations to a common transfer pumping station, and sensing the flow rate of said transfer station to balance the intake of said transfer station by dilution of the slurry at the transfer station.

* * * * *